US005514848A

United States Patent [19]

Ross et al.

[11] Patent Number: 5,514,848

[45] Date of Patent: May 7, 1996

[54] PLASMA TORCH ELECTRODE STRUCTURE

[75] Inventors: Douglas A. Ross, Richmond; Alan Burgess, North Vancouver, both of Canada

[73] Assignee: The University of British Columbia, Vancouver, Canada

[21] Appl. No.: 323,188

[22] Filed: Oct. 14, 1994

[51] Int. Cl.$^6$ .................................................. B32K 10/00

[52] U.S. Cl. ................................ 219/121.52; 219/121.5; 219/121.51; 219/119

[58] Field of Search .................................. 219/119, 118, 219/121.5, 121.51, 121.52, 121.48, 121.57, 74, 75

[56] References Cited

U.S. PATENT DOCUMENTS

| | | | |
|---|---|---|---|
| 3,578,943 | 5/1971 | Schoumaker . | |
| 3,770,935 | 11/1973 | Tateno et al. . | |
| 3,914,573 | 10/1975 | Muehlberger | 219/121.52 |
| 4,570,048 | 2/1986 | Poole | 219/121.5 |
| 4,670,290 | 6/1987 | Itoh et al. . | |
| 4,855,563 | 8/1989 | Beresnev et al. . | |
| 4,882,465 | 11/1989 | Smith et al. | 219/121.48 |
| 4,982,067 | 1/1991 | Marantz et al. . | |
| 5,008,511 | 4/1991 | Ross . | |
| 5,144,110 | 9/1992 | Marantz et al. . | |
| 5,296,668 | 3/1994 | Foreman et al. | 219/121.48 |
| 5,406,046 | 4/1995 | Landes | 219/121.47 |
| 5,420,391 | 5/1995 | Delcca . | |

FOREIGN PATENT DOCUMENTS

| | | |
|---|---|---|
| 427194 | 5/1991 | European Pat. Off. . |

OTHER PUBLICATIONS

New Plasma Spray Apparatus, Pashehenko & Saakov, Proceedings of the 7th National Thermal Spray Conference, 20–24 Jun. 1994.

*Primary Examiner*—Mark H. Paschall
*Attorney, Agent, or Firm*—C. A. Rowley

[57] ABSTRACT

An electrode structure is composed of a gas passage containing a cathode ending in a cathode tip adjacent one end of the passage and has an anode electrode adjacent to the other end of the passage. A restriction is formed within the passage between the cathode and anode electrode to restrict the cross sectional area of the passage an accelerate the flow of gas from the cathode toward the anode and thereby increase the arc length and permit a reduced amperage to voltage (A/V) ratio for a given power input to the structure.

20 Claims, 2 Drawing Sheets

PLASMA TORCH ELECTRODE STRUCTURE

FIELD OF THE INVENTION

The present invention relates to a plasma torch electrode structure, more particularly, the present invention relates to a plasma torch electrode structure adapted to reduce the ampere to voltage ratio required for a given power application to the electrode.

BACKGROUND OF THE INVENTION

A variety of different electrode structures are used in the construction of plasma torches wherein the plasma gas passes around the cathode and then flows concurrently with the arc to the anode. In most cases, the plasma gas travels in a spiral path to the anode. Some suggested structures are shown in U.S. Pat. Nos. 3,578,943 issued Mar. 19, 1969 to Schoumaker; 3,770,935 issued Nov. 6, 1973 to Tateno et al.; 4,670,290 issued Jun. 2, 1987 to Itoh et al.; or 4,855,563 issued Aug. 8, 1989 to Beresnev et al.

Tateno discloses a multiple arc system that incorporates a throttle aperture in the gas stream path and claim that the arc voltage may be increased to double that of conventional plasma jet generators in use at that time. Itoh et al describes a specific arrangement of a main and an auxiliary torch used in combination to form a hair pin arc which when formed extends from the cathode of the main to the cathode of the auxiliary torch to provide an extended arc length. An arc transfer system may be used to build the length of at least one of the arcs.

U.S. Pat. No. 3,140,380 issued Jul. 7, 1964 to Jensen and U.S. Pat. Nos. 4,982,067 and 5,144,110 issued Jan. 1, 1991 and Sep. 1, 1992 both to Marantz et al. show the use of concentric torches to generate a common plasma flow.

A preferred torch structure is shown in U.S. Pat. No. 5,008,511 issued Apr. 16, 1991 to Ross. In this torch, a plurality of individual torches are arranged around an axial passage through which the powder or other materials used in the plasma is introduced is thereby subjected to the plasma jets issuing from each of the torches. In this system, a cathode is provided within a chamber and has a cathode tip facing towards an anode. The plasma gasses are introduced and passed around the cathode, are heated by the arc between the anode and cathode, then pass out through a passage to contact with the powder material or the like.

It is well known that it is beneficial to operate a torch using as high a voltage as possible thereby minimize the amperage (A) required for a given power load, i.e. the range of amperage to voltage (V) i.e. (A/V) should be minimized and work is continuing see, New Plasma Spray Apparatus, Pashchenko and Saakov, Proceedings of the 7th National Thermal Spray Conference, 20–24 June 1994, Boston, Mass.

It is also known that several of the major factors influencing the ratio A/V in a given torch are;

a. the gas flow through the torch from the cathode to the anode, i.e. the higher the gas flow, the lower the ratio A/V, b. the composition of gas, c. the diameter of the arc; i.e. the smaller the arc diameter, the lower the ratio A/V, and d. the length of the arc; i.e. the longer the arc, the lower the ratio A/V.

In most torches, the passage extending from the cathode tip to the anode tapers to the smallest diameter at the anode, i.e. is generally or essentially the same cross-section for a significant portion of the distance between the cathode and the anode and then is tapered toward the gas outlet which is generally through the anode. Thus, the gas travelling through the passage leading to the anode outlet is not accelerated by the shape (cross sectional area) of the passage of the passage and its velocity remains substantially constant (except for the change in velocity due to the increase in temperature of the gases) until accelerated by the tapering of the passage toward the anode outlet. Thus in the length of the passage through which the arc passes the velocity is not controlled to confine the arc and extend its length before arcing or discharging to the anode.

BRIEF DESCRIPTION OF THE PRESENT INVENTION

It is the main object of the present invention to provide a new torch structure wherein a constriction is provided in the gas and arc flow passage that changes the velocity of gas flow and the diameter of the arc to significantly reduce the ratio of amperage to voltage (A/V) for a given power application.

Broadly, the present invention relates to an electrode structure comprising a cathode, an annular anode structure having an anode electrode at an end of said anode remote from said cathode, a gas passage, extending around a portion of said cathode and from said cathode through said anode structure to said anode electrode at a downstream end of said passage remote from said cathode, said cathode having a cathode tip concentric with said passage, means for introducing gas into said passage for flow around said portion of said cathode, past said cathode tip and through said anode structure to said anode electrode, a restriction means defining the cross sectional size of a portion of said passage through said anode structure, said restriction means having an upstream section adjacent to said cathode tip, a downstream section remote from said cathode tip and a throat section therebetween, said upstream being spaced downstream in the direction of gas flow from said cathode by a distance forming a first portion of said passage, said downstream section of said restriction means terminating at said anode electrode, said upstream section of said restriction means having a shape that gradually restricts the cross sectional area of said passage into said throat section that defines a minimum cross sectional area of said passage is shaped to accelerate the velocity of gas flowing through said passage which flow is also accelerated by heating and expansion in said passage so that the gas flow velocity through said restriction means is sufficient to carry an arc between said cathode tip through said restriction means and to confine said arc for passage through said throat section to discharge to said anode electrode whereby said arc may extend between said cathode and said anode electrode and pass through said restriction means spaced from walls of said passage.

Preferably said restriction means will be electrically conductive, means electrically connecting said electrically conductive restriction means to said anode structure, said distance being sufficient that an initially formed arc may be formed during start-up of said torch between said cathode tip and said upstream section of said restriction means, said restriction means being shaped to ensure said gas velocity through said restriction means is sufficient to carry said initially formed arc through said restriction means and prevent shorting of said arc to said restriction means to establish said arc between said cathode tip and said anode electrode.

Preferably an insulating sleeve will surround said cathode tip and define the inner circumference of said first portion of said passage between said cathode tip and said restriction means, said first portion extending along the length of said passage to ensure a minimum arc length between said anode and cathode at least equal to the spacing between said cathode tip and said restriction means Preferably, the ratio of the cross sectional area of said first portion to said minimum cross section area of said passage will be in the range of 2–7 to 1.

Preferably, guiding means will be provided encircling said cathode between said cathode and said insulating sleeve to centre said cathode in said insulating sleeve and preferably said guiding means will provide a fin structure shaped to direct flow of gas around said cathode tip in a spiral pattern toward said restriction means.

Preferably an electrically conductive sleeve electrically connected to said anode will encircle said insulating sleeve and will extend said anode the full length of an arc formed between said cathode tip and said anode and will be provided with electrical connection solely on the side of said cathode tip remote from said other end.

Preferably said electrode structure will further comprising cooling means surrounding said anode to cool said passage.

BRIEF DESCRIPTION OF THE DRAWINGS

Further features, objects and advantages will be evident from the following detailed description of the preferred embodiments of the present invention taken in conjunction with the accompanying drawings in which;

FIG. 2 is a section similar to FIG. 1 showing a typical arc pattern between the cathode and anode and also showing an inlet for powder or the like.

DESCRIPTION OF THE PREFERRED EMBODIMENTS

Figure 1:
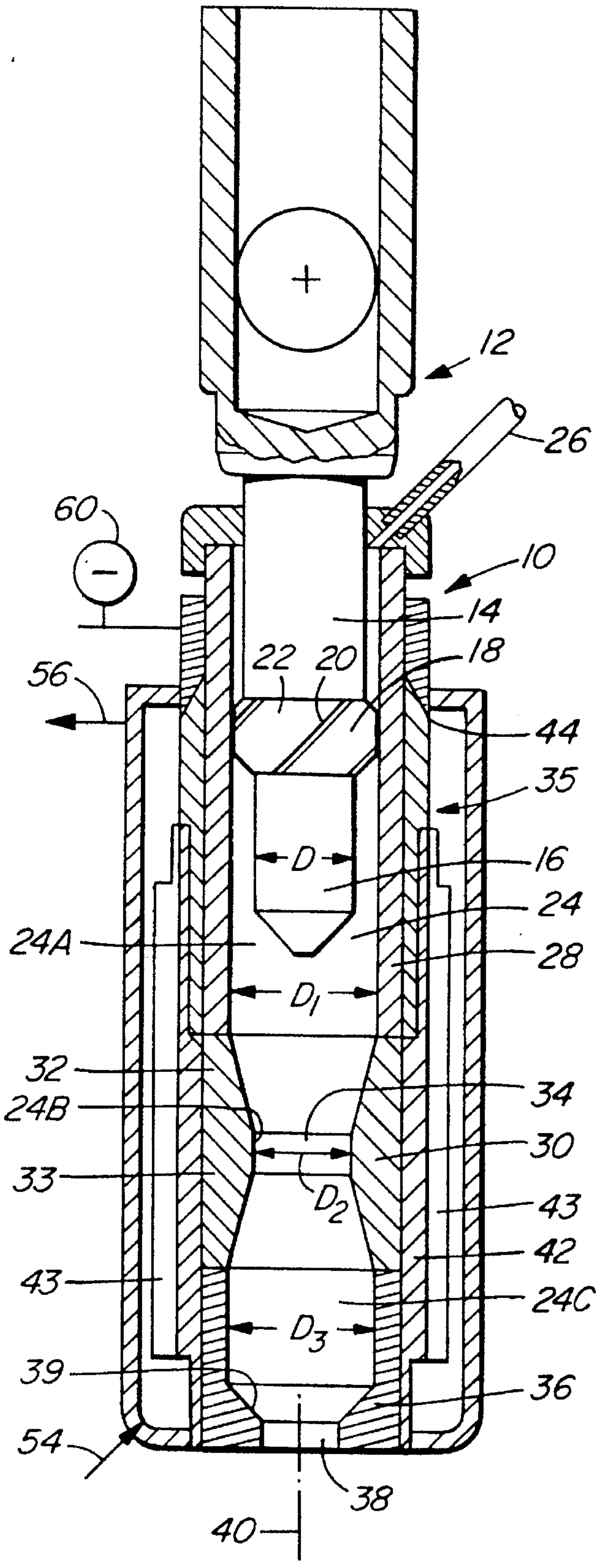
FIG. 1 is a schematic cross-sectional view of a plasma torch electrode structure constructed in accordance with the present invention.
Figure 2:
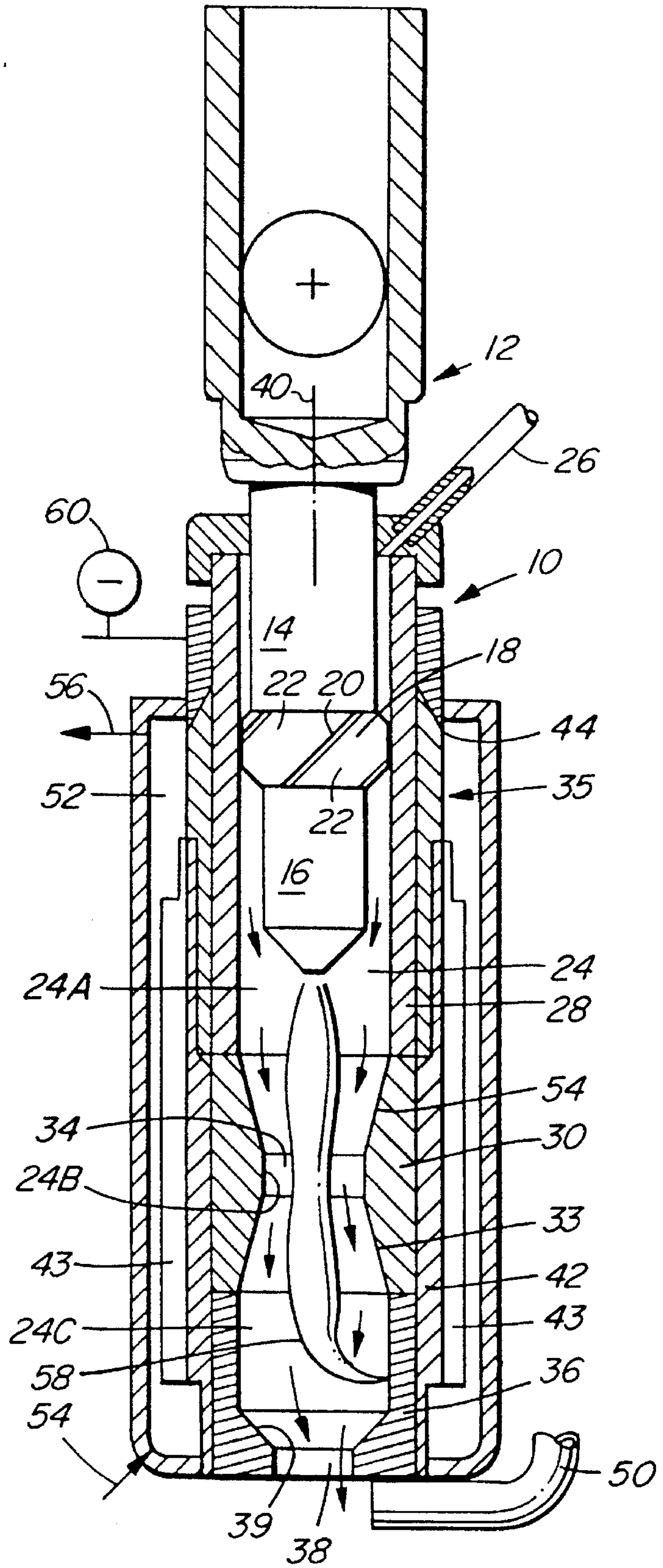

As shown in FIGS. 1 and 2, the electrode structure of the present invention indicated at 10 includes an cathode holder 12 connected adjacent to one end of an electrode 14 (cathode 14) the other end of which forms a cathode tip 16. A suitable guiding element 18 is positioned in surrounding relationship to the cathode 14 (adjacent to the tip 16) and centres the cathode 14 in the gas passage 24. The guide element 18 is provided with sloped fins 20 defining passages 22 there between that direct gas introduced by the gas inlet pipe 26 upstream of the cathode tip 16.and flowing axially along a portion of the passage 24 surrounding the cathode 14 (i.e. between the cathode 14 and the inner diameter of ceramic insulating sleeve 28) to flow in a helical path around the cathode tip 16.

As above indicated the portion of the passage 24 surrounding the cathode 14 has its outside surface defined by the inside diameter of an insulating cylindrical sleeve 28 preferably a ceramic tube 28 that extends around the cathode 14 and also defines the circumference of a first portion 24A of passage 24 extending from the cathode tip 16 to a restriction forming sleeve 30. The tube 28 extends from the upstream end of the passage 24 i.e. location where the inlet pipe 26 introduces plasma gasses to the sleeve 30 and is fitted in abutting relationship with the restriction forming sleeve 30. The first portion 24A of the passage 24 has a cross sectional area represented by the diameter $D_1$.

The restriction forming sleeve 30 is formed to define a gradually tapering passage that is shaped to smoothly reduce the cross-sectional area of the passage 24 from the cross sectional area of the first portion 24A (diameter $D_1$) to the throat or minimum cross seconal area portion 24B of the passage 24 represented by the diameter $D_2$ and then expands the cross sectional area of the passage 24 to a cross sectional area represented by the diameter $D_3$ which preferably is essentially the same as that of the first portion 24A i.e. diameter $D_3$ preferably equal to $D_1$. The restriction sleeve 30 is shaped as above indicated with a tapering upstream section 32 that gradually reduces cross sectional area of the passage 24 to a minimum in the throat 34 which defines the smallest or minimum cross section (diameter $D_2$) ) portion 24B (in throat 34) of the passage 24. The sleeve 30 is formed with a downstream section 33 which, as above indicated, increases the cross sectional area of the passage 24 from the area defined by the minimum diameter $D_2$ of the portion 24B (throat 34) to expand the cross sectional area of the passage 24 to that of the downstream expanded portion 24C of passage 24. The downstream expanded portion 24C is preferably formed through the anode electrode 36. Preferably, the sleeve 30 terminates at its end remote from the cathode 14 i.e. at the end of an outwardly expanding downstream section 33 in an abutting relationship with the anode electrode 26.

The changes in cross sectional area of the passage 24 are as above indicated shaped to gradually smoothly change the velocity of the gasses flowing through the passage 24 i.e. in a manner to minimize the formation of eddies or otherwise disturb the flow of gasses through the passage 24. This is attained primarily by having no short radius bend that would cause a disruption of the flow along the passage 24.

The sleeve 30 is preferably made of conducting material and as will be described below is in electrical contact with the anode including the anode electrode 26.

The cross sectional area of the passage 24 as defined by the upstream section 32 of the restriction sleeve 30 is smoothly reduced preferably in a manner to minimize the formation of eddies in the gas flowing through the passage 24 and in any event in a manner to ensure the velocity of gas flow through said passage (which flow is also accelerated by heating which cause the gas to expand in said passage) is accelerated to ensure the velocity of the gas through the passage 24 in particular through the restriction sleeve 30 is sufficient to carry an arc between said cathode tip 16 through the restriction sleeve 30 and confine the arc in the gas so that the arc passes through the restriction sleeve 30 to the anode electrode 36 adjacent to the end of the passage 24 remote from the cathode 14. This, as will be described below, results in the arc extending between the cathode tip 16 and the anode electrode 36 passing through the restriction 30 spaced from walls of the passage 24 and when the sleeve 30 is made, as is preferred from conducting material and is electrically connected to the anode, prevent the arc from shorting to the restriction sleeve 30 i.e so the arc passes through the throat 34 of the sleeve 30 to the anode electrode 36

As above indicated it is preferred to make the sleeve 30 of conducting material and to electrically connect the sleeve 30 to the anode structure so that on start-up a short arc may initially be formed between the cathode tip 16 and the upstream section 32 of the sleeve 30. The sleeve 30 is shaped so that the velocity of the gas passing through the sleeve (which is determined by the cross sectional area of the passage 24 through the sleeve) is sufficient to confine the arc and carry it through the restriction sleeve 30 and form an elongated arc between the cathode tip 16 and the anode electrode 36.

The restriction sleeve 30 and anode electrode 36 are part of an anode structure 35 which also includes an annular anode holder 42 that functions to retain these elements preferably by a friction fit so they may easily be changed and to electrically connect the restriction sleeve 30 when it is made of conductive material as preferred, the anode electrode 36 and a retaining sleeve 44. The holder 42 is preferably formed with cooling fins 43 to facilitate heat transfer to a cooling fluid as will be described below.

The retaining sleeve 44 is preferably formed from cast copper and is in intimate contact with the outside of the insulating sleeve 28 to facilitate heat transfer between the sleeves 28 and 44. to facilitate cooling of the sleeve 28.

The restriction sleeve 30 and the anode electrode 36 each is preferably is in the form of a sleeve insert that is snugly received within the anode holder 42 and is pressed into position i.e. held in position by friction respectively between the holder 42 and the sleeve 30 and between the holder 42 and anode electrode 36. The sleeve 30 is pressed against the end of the insulating tube or sleeve 28 and is thus positioned in abutting relation to the sleeve 28 and the electrode 36 is pressed against the end of the restriction 30 remote from the tube 28 and is held in abutting relationship with that end of the sleeve 30.

The anode electrode 36 in the version illustrated in FIGS. 1 and 2 has an outlet 38 significantly smaller in cross sectional area than the section 24C. There is a tapered transition 39 from the section 24C to the outlet passage 38. The outlet passage 38 in the version shown in FIGS. 1 and 2 also has its longitudinal axis aligned with the longitudinal axis 40 of the passage 24. If desired the transition 39 may be abrupt and the axis of the outlet 38 may be at an acute angle to the axis 40.

It will be noted that the longitudinal centre line or axis 40 of the passage 24 is a straight line and that the cathode 12 is right cylindrical in cross section and is concentric with the axis 40 of the passage 24 as are the restriction 30 including its sections 32 and 33 and throat 34 and the anode electrode 36.

The rate of taper or change in diameter of the passage 24 from diameter $D_1$ to diameter $D_2$ as above described i.e. the shape of the upstream portion 32 is set based on the gas velocity required to maintain the arc 58 (see FIG. 2) extending between the cathode tip 16 and the anode 36 spaced away from the walls of the passage 24 to ensure the formation of a long arc and to prevent shorting to the sleeve 30 when the sleeve 30 is electrically conductive and is connected to the anode. This shape is dependent on the amount and velocity of gas fed to the system through gas inlet 26 and the heat transferred from the arc 58 to the gas which causes the gas velocity to increase due to expansion of the gas. The velocity of the is the prime factor causing the arc to be confined in the passage 24 without shorting until the arc reaches the anode electrode 26. Thus the size and shape of the passage 24 may be varied depending on the end use of the torch i.e. inlet gas velocity, torch temperature, etc.

In the illustration of FIG. 2 powder and/or other material to be subjected to the plasma jet issuing from the outlet 38 is directed into the jet from the tube 50. It will be apparent that an number of different torches constructed in accordance with the present invention may, if desired be, coupled together and their outputs combined to form a singe plasma jet.

The position of the cathode, particularly the cathode tip 16 preferably is fixed relative to the device but may if desired be made adjustable for axial movement along the passage 24.

It is preferred that the areas of the passage 24 defined by the diameter dimensions $D_1$ and $D_3$ be substantially equal and that the ratio of areas defined by the diameter $D_1$ of the first section 24A of passage 24 to the cross sectional area of throat 34 defined by the diameter $D_2$ of the restricted section 24B be in the range of between 2 and 7 to 1.

The diameter of the cathode tip is indicated at $D_4$ will be correlated with the diameter $D_1$ to provide reasonable passage cross sectional area for a gas flow around the cathode tip 16, i.e. between the cathode tip 16 and the inner surface of the ceramic tube 28.

In the illustrated embodiment a cooling chamber schematically indicated at 52 surrounds the anode structure 35 and extends from adjacent to the anode electrode 36 to a position on the side of the cathode tip 16 remote from the anode 36. The chamber 52 has a cooling fluid inlet 54 and outlet 56 for circulation of cooling fluid through the chamber 52.

As illustrated in FIG. 2, the arc 58 formed between the cathode tip 16 and the anode 36 is relatively narrow and very long. This formation of the relatively long and small cross-section arc 58 enables the torch to operate with a small ampere to volt ratio (A/V) for a given power consumption which ratio is significantly reduced relative to that would be obtained if the restriction sleeve 30 was not provided and the gas velocity not manipulated to entrap and carry the arc through the sleeve 30 to the anode electrode 36.

During start up of the arc in the preferred embodiment where the sleeve 36 is made of conductive material and is electrically connected to the anode electrode 36 the insulating sleeve 28 directs the initially formed arc to the restriction 30 and an arc is initially formed between the cathode tip 16 and the upstream section 32 of restriction sleeve 30. The initially formed arc generates heat which increases the velocity of the gas flowing along passage 24 to a velocity that carries the arc through the restriction sleeve 30 i.e. stops the arc from shorting to the restriction sleeve 30 and carries it through the restriction sleeve 30 to the anode electrode 36.

The cooling applied to the ceramic sleeve 28 and to the anode structure 35 in particular to the restriction 30 for example from the chamber 52 also influences the effectiveness of the gas to carry the arc 58 through the restriction 38 as the cooler gas adjacent to the surface of the passage 24 changes the degree of ionization of the gas and aids in preventing shorting of the arc to the restriction 30 once the arc is established between the cathode tip 16 and the anode electrode 36. Thus it is important to ensure the torch is designed to have adequate cooling It will be noted that the electrical connection 60 for the anode structure 35 is connected to the retaining sleeve 44 and is positioned at the side of the tip 16 remote from the anode electrode 36 so that the current flow through the system i.e from the cathode 14 to the anode electrode 36 and through the anode structure 35 to the contact 60 completely encircles the arc 58 and tends to isolate the arc 28 from external magnetic forces e.g. force generated in adjacent torches when the torches are close coupled in side by side relationship and thereby improve the operation of the torch.

EXAMPLE

In a particular embodiment of the invention $D_1$ and $D_3$ each is equal to 0.375 inches, $D_2$ to 0.22 inches and the transition was made 0.28 inches along the axis 40. The tapered upstream section 32 was substantially conical but was gradually curve to tangency with the throat 34 and the section 24A of the passage 24 to substantially prevent the formation of eddies in the gas flow. There are no short radius curve sections defined along the passage 24.

The length of the throat 34 measured along the axis 40 is not critical, in the particular example given above it was 0.10 inches, but it could be any suitable length. The transition from the minimum diameter $D_2$ to the final diameter $D_3$ is not as important as the reduction in diameter from $D_1$ to $D_2$. In the specific torch being described this downstream section from the throat 34 to the anode electrode 36 was 0.65 inches long measured along the axis 40.

Having described the invention, modifications will be evident to those skilled in the art without departing from the scope of the invention as defined in the appended claims.

We claim:

1. An electrode structure for decreasing the ampere to volts ratio of the operating power for a plasma torch comprising a cathode, an hollow annular anode structure including an anode electrode at a downstream end of said anode structure remote from said cathode, a gas passage, an interior of said hollow anode structure defining a portion of a circumferential wall of said passage, said gas passage being symmetrical relative to a longitudinal axis of said electrode structure and extending around a portion of said cathode and from said cathode through said hollow anode structure to said anode electrode, said cathode having a cathode tip concentric with said passage, means for introducing gas into said passage for flow around said portion of said cathode, past said cathode tip and through said hollow anode structure, said hollow anode structure further including a restriction means defining the cross sectional size of a portion of said passage through said anode structure between said cathode and said anode electrode, said restriction means having an upstream section adjacent to said cathode tip, a downstream section remote from said cathode tip and a throat section therebetween, said throat section defining a section of said passage having a minimum cross sectional area, said upstream section being spaced downstream in the direction of gas flow from said cathode by a distance to form a first portion of said passage between said cathode and said restriction means, said first portion of said passage having a first cross sectional area, the ratio of said first cross sectional area to said minimum cross sectional area being at least 2 to 1, said downstream section of said restriction means terminating at said anode electrode, said upstream section of said restriction means having a shape that gradually and smoothing constricts the cross sectional area of said passage from said first cross sectional area to said minimum in said throat section and is shaped to accelerate the velocity of gas flowing through said passage which flow is also accelerated by heating and expansion in said passage so that the gas flow velocity through said restriction means is sufficient to carry an arc between said cathode tip through said restriction means and to confine said arc for passage through said throat section, said downstream section being shaped to gradually expand the cross sectional area of said passage from a downstream end of said throat to said anode electrode so that said arc may discharge to said anode electrode whereby said arc may extend between said cathode and said anode cathode and pass through said restriction means while being constrained and spaced from walls of said passage by said gas flow and said ampere to volts ratio is reduced relative to a similar electrode structure without restriction means.

2. An electrode structure as defined in claim 1 wherein said restriction means is electrically conductive and said electrode structure further includes means electrically connecting said electrically conductive restriction means to said anode structure, said distance being sufficient that an initially formed arc may be formed during start-up of said torch between said cathode tip and said upstream section of said restriction means, said restriction means being shaped to ensure said gas velocity through said restriction means is sufficient to carry said initially formed arc through said restriction means and prevent shorting of said arc to said restriction means to establish said arc between said cathode tip and said anode electrode.

3. An electrode structure as defined in claim 1 wherein an insulating sleeve surrounds said cathode tip and defines the inner circumference of said first portion of said passage between said cathode tip and said restriction means, said first portion extending along the length of said passage to ensure a minimum arc length between said anode and cathode at least equal to the spacing between said cathode tip and said restriction means.

4. An electrode structure as defined in claim 2 wherein an insulating sleeve surrounds said cathode tip and defines the inner circumference of said first portion of said passage between said cathode tip and said restriction means, said first portion extending along the length of said passage to ensure a minimum arc length between said anode and cathode at least equal to the spacing between said cathode tip and said restriction means.

5. An electrode structure as defined in claim 1 wherein said ratio of said first cross sectional area to said minimum cross sectional area is in the range of 2–7 to 1.

6. An electrode structure as defined in claim 2 wherein said ratio of said first cross sectional area to said minimum cross sectional area is in the range of 2–7 to 1.

7. An electrode structure as defined in claim 3 wherein said ratio of said first cross sectional area to said minimum cross sectional area is in the range of 2–7 to 1.

8. An electrode structure as defined in claim 4 wherein said ratio of said first cross sectional area to said minimum cross sectional area is in the range of 2–7 to 1.

9. An electrode structure as defined in claim 3 wherein guiding means are provided surrounding said cathode and between said cathode and said insulating sleeve to centre said cathode in said insulating sleeve, said guiding means being positioned in said gas passage and having a fin structure shaped to direct flow of gas around said cathode tip in a spiral pattern toward said restriction means.

10. An electrode structure as defined in claim 4 wherein guiding means are provided surrounding said cathode and between said cathode and said insulating sleeve to centre said cathode in said insulating sleeve, said guiding means being positioned in said gas passage and having a fin structure shaped to direct flow of gas around said cathode tip in a spiral pattern toward said restriction means.

11. An electrode structure as defined in claim 7 wherein guiding means are provided surrounding said cathode and between said cathode and said insulating sleeve to centre said cathode in said insulating sleeve, said guiding means being positioned in said gas passage and having a fin structure shaped to direct flow of gas around said cathode tip in a spiral pattern toward said restriction means.

12. An electrode structure as defined in claim 8 wherein guiding means are provided surrounding said cathode and between said cathode and said insulating sleeve to centre said cathode in said insulating sleeve, said guiding means being positioned in said gas passage and having a fin structure shaped to direct flow of gas around said cathode tip in a spiral pattern toward said restriction means.

13. An electrode structure as defined in claim 3 wherein said anode encircles said insulating sleeve and extends the full length of said arc formed between said cathode tip and said anode electrode and is provided with an electrical connection solely on the side of said cathode tip remote from said anode electrode.

14. An electrode structure as defined in claim 4 wherein said anode encircles said insulating sleeve and extends the full length of said arc formed between said cathode tip and said anode electrode and is provided with an electrical connection solely on the side of said cathode tip remote from said anode electrode.

15. An electrode structure as defined in claim 7 wherein said anode encircles said insulating sleeve and extends the full length of said arc formed between said cathode tip and said anode electrode and is provided with an electrical connection solely on the side of said cathode tip remote from said anode electrode.

16. An electrode structure as defined in claim 8 wherein said anode encircles said insulating sleeve and extends the full length of said arc formed between said cathode tip and said anode electrode and is provided with an electrical connection solely on the side of said cathode tip remote from said anode electrode.

17. An electrode structure as defined in claim 9 wherein said anode encircles said insulating sleeve and extends the full length of said arc formed between said cathode tip and said anode electrode and is provided with an electrical connection solely on the side of said cathode tip remote from said anode electrode.

18. An electrode structure as defined in claim 10 wherein said anode encircles said insulating sleeve and extends the full length of said arc formed between said cathode tip and said anode electrode and is provided with an electrical connection solely on the side of said cathode tip remote from said anode electrode.

19. An electrode structure as defined in claim 11 wherein said anode encircles said insulating sleeve and extends the full length of said arc formed between said cathode tip and said anode electrode and is provided with an electrical connection solely on the side of said cathode tip remote from said anode electrode.

20. An electrode structure as defined in claim 12 wherein said anode encircles said insulating sleeve and extends the full length of said arc formed between said cathode tip and said anode electrode and is provided with an electrical connection solely on the side of said cathode tip remote from said anode electrode.

* * * * *